(12) United States Patent
Bell

(10) Patent No.: US 6,282,900 B1
(45) Date of Patent: Sep. 4, 2001

(54) CALCIUM CARBIDE POWER SYSTEM WITH WASTE ENERGY RECOVERY

(76) Inventor: Ealious D. Bell, 285 Crosshaven La., San Diego, CA (US) 92139

( * ) Notice: Subject to any disclaimer, the term of this patent is extended or adjusted under 35 U.S.C. 154(b) by 0 days.

(21) Appl. No.: 09/604,715

(22) Filed: Jun. 27, 2000

(51) Int. Cl.[7] .................................................. F01K 17/00
(52) U.S. Cl. ................................ 60/648; 60/649; 60/671; 60/673; 60/676
(58) Field of Search ............................. 60/648, 649, 650, 60/676, 643, 645, 670, 671, 673, 682, 665, 651

(56) References Cited

U.S. PATENT DOCUMENTS

| | | |
|---|---|---|
| 2,357,186 | 8/1944 | Murphy et al. . |
| 2,951,748 | 9/1960 | Gfeller . |
| 3,498,767 | 3/1970 | Foster . |
| 3,545,207 | 12/1970 | Barber et al. . |
| 3,664,134 | 5/1972 | Seitz . |
| 3,975,913 | 8/1976 | Erickson . |
| 4,023,367 | 5/1977 | Izumi . |
| 4,090,362 | 5/1978 | Bourque . |
| 4,224,797 | 9/1980 | Kelly . |
| 4,257,232 | * 3/1981 | Bell ....................................... 60/676 |
| 5,409,784 | * 4/1995 | Bromberg et al. ..................... 429/13 |
| 6,130,260 | * 10/2000 | Hall et al. ............................ 518/703 |

\* cited by examiner

Primary Examiner—Hoang Nguyen
(74) Attorney, Agent, or Firm—Blakely, Sokoloff, Taylor & Zafman LLP

(57) ABSTRACT

A calcium carbide based power system for stationary and mobile power plants. The carbide is reacted with water to create heat and acetylene, with the acetylene then being burned to heat a boiler for providing steam to a steam expander. The exhaust of the steam expander is condensed and pumped back into the boiler, first being pre-heated by a heat exchanger using the heat in burner exhaust gas and then in the carbide-water reactor to further pre-heat the boiler makeup water (steam) and to cool the reactor. The system may limit the excess water required for the carbide-water reactor, and provides recovery of the heat given off in the generation and combustion of the acetylene for maximum system efficiency. The system may further provide for preheating the combustion air with waste heat from the exhaust of the steam expander. The system may further provide for preheating the combustion air with heat from the acetylene produced by the reactor, thereby removing moisture from the acetylene. Dissociated hydrogen may be recovered from the exhaust of the steam expander by cyclonic separation and burned as fuel in the boiler.

20 Claims, 1 Drawing Sheet

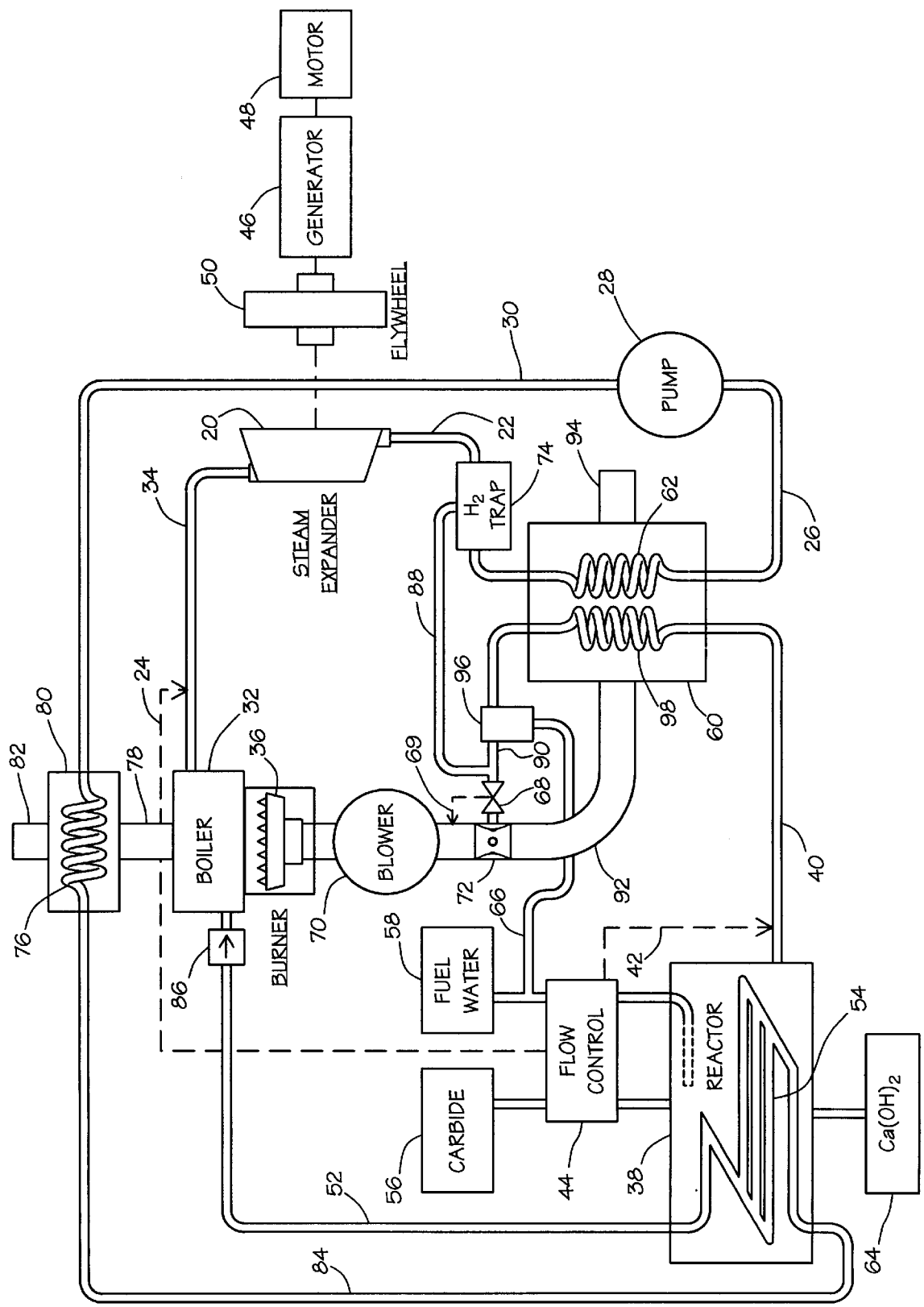

CALCIUM CARBIDE POWER SYSTEM WITH WASTE ENERGY RECOVERY

FIELD OF THE INVENTION

The present invention relates to the field of power systems.

BACKGROUND OF THE INVENTION

The present invention is very adaptable to provide either mechanical or electrical power in both stationary and mobile systems. The preferred embodiments, however, are intended for use in mobile systems, such as in the powering of automobiles, trucks and other vehicles. As such, the prior art relating to power plants for such mobile systems and the fuels used therein will be discussed, it being understood however, that the present invention is not so limited in its application.

At the present time, a very large majority of vehicles in day-to-day operation contain internal combustion engines operating on some suitable hydrocarbon fuel. Of these, most operate on gasoline, while smaller numbers operate on diesel fuels and liquid propane. These fuels, however, are becoming increasingly expensive, are subject to supply limitations by foreign powers, and would appear to be nearly exhaustible in supply in the not too distant future. Accordingly, it would be desirable to develop other propulsion systems based on other fuels or other sources of energy more readily available and not as subject to control by foreign powers.

One type of propulsion energy which attracted considerable interest in the early days of automobiles, and is the subject of substantial study at the present time, is electricity. However, since the early efforts, the rate of advance of the energy storage (battery) technology has been disappointing, and electric powered cars operating on batteries are currently highly limited in range and in recharging rate in comparison to the range of hydrocarbon fuel vehicles and the speed with which they may be refueled. Vehicles powered with electricity, however, have the advantage that the original or primary source of energy used to charge the batteries may be substantially anything, hydro-electric plants, fossil fuel burning plants, and nuclear power generating plants being the most common. Obviously, even solar energy is a potential source of power to recharge the batteries.

Other fuels have also been considered for use in vehicles, including hydrogen and acetylene. Hydrogen has the advantage of almost unlimited supply from water, and has a high energy content on a per pound basis, though poses difficult storage problems and substantial safety hazards. In essence, the concept is to use hydrogen as an energy containing medium for burning in a vehicle, thereby creating water vapor in the exhaust. The hydrogen would be generated at some remote power plant using coal, nuclear or other sources of energy, probably by the decomposition of water at that location. Such use of hydrogen as a fuel, however, has in general not proceeded beyond the very early experimental stages.

Acetylene, as previously mentioned, has also been proposed for use as a fuel for internal combustion engines. On a per pound basis, acetylene has a high energy content (higher than gasoline) and forms an explosive mixture with air over a wide range of mixing ratios. It also may be generated relatively easy from calcium carbide, a material which in itself is relatively safe and easily handled until mixed with water. As such, the safety hazard of carrying calcium carbide in a vehicle is probably substantially less than that of carrying gasoline, liquid propane or other fuels in their combustible state.

One prior art system for utilizing acetylene as a source of fuel in a mobile system is disclosed in U.S. Pat. No. 3,664,134. In that system, calcium carbide and water are combined in a reactor to form acetylene, which is then used as a fuel for a conventional internal combustion engine. The system of that patent also features as afterburner, and a calcium hydroxide scrubber for the engine exhaust for reduction of atmospheric pollutants. This system has the advantage of being operative with a conventional internal combustion engine; however, the acetylene generator has certain inefficiencies, in that apparently a large excess of water is required in the wet process for generating acetylene in the reactor in order to keep the reactor temperatures down. More importantly, all of the heat given off in the exothermic reaction between the calcium carbide and the water is lost, as there is no way to recover this heat in any useful manner for the system disclosed.

Another prior art system for utilizing acetylene as a source of fuel in a mobile system is disclosed in U.S. Pat. No. 4,257,232. This system passes the feedwater through the reactor to cool the reactor and preheat the feedwater before delivering the feedwater to the boiler. While this recovers heat given off in the exothermic reaction between the calcium carbide and the water, energy is lost in the exhaust of the burner that heats the boiler, in the condensation of the exhaust steam and water from the steam expander, and in the dissociation of hydrogen and oxygen in the steam expander.

SUMMARY OF THE INVENTION

A calcium carbide based power system for stationary and mobile power plants. The carbide is reacted with water to create heat and acetylene, with the acetylene then being burned to heat a boiler for providing steam to a steam expander. The exhaust of the steam expander is condensed and pumped back into the boiler, first being pre-heated by a heat exchanger using the heat in burner exhaust gas and then in the carbide-water reactor to further pre-heat the boiler makeup water (steam) and to cool the reactor. The system may limit the excess water required for the carbide-water reactor, and provides recovery of the heat given off in the generation and combustion of the acetylene for maximum system efficiency. The system may further provide for preheating the combustion air with waste heat from the exhaust of the steam expander. The system may further provide for preheating the combustion air with heat from the acetylene produced by the reactor, thereby removing moisture from the acetylene. Dissociated hydrogen may be recovered from the exhaust of the steam expander by cyclonic separation and burned as fuel in the boiler.

BRIEF DESCRIPTION OF THE DRAWINGS

The FIGURE is a block diagram of a power system in accordance with the present invention.

DETAILED DESCRIPTION OF THE INVENTION

The present invention system contemplates the use of calcium carbide and water to generate heat and acetylene for use in power plants, including mobile power plants, to provide the desired output power. This system further contemplates the use of the heat given off in the carbide-water reaction as part of the useful heat of the system so as to improve the overall efficiency of the system. In this sense, the present invention contemplates the use of carbide as the primary fuel. The system contemplates a variety of energy recovery techniques to further increase the overall efficiency of the system. An example of the system of the present invention is shown in the FIGURE, and described in detail in the following description.

This system will first be described in a general overview, with further details of each of the various elements of the system being subsequently described. The embodiment of the invention shown in the FIGURE utilizes a steam expander 20, preferably operating as a closed loop system, with the outlet of the steam expander 22 being directed through a condenser coil 62 to provide low-pressure water in a condenser outlet line 26. A pump 28 pumps the water through a pump discharge line 30, absorbing heat from an exothermic reaction in a reaction chamber 38, and exiting through a discharge line 52 back into the boiler 32 for conversion to steam to supply the steam expander through a steam line 34. A one way valve 86 prevents backflow from the boiler due to pressure increases caused by the heating of the feed water in the boiler. These portions of the steam expander loop are conventional and well known.

The main source of heat for the boiler 32 is acetylene ($C_2H_2$) provided to one or more burners 36 by a carbide-water reactor 38. The generated gaseous acetylene, which contains substantial amounts of water vapor, is provided in a wet acetylene supply line 40 on a demand or as needed basis. In one embodiment, dry carbide is delivered to a reaction grid 54. Fuel water is sprayed on the dry carbide to form acetylene in an exothermic reaction. Feed water flows from a feed water line 84 through the reaction grid to cool the reaction grid and preheat the feed water. The preheated feed water is then delivered to the boiler. The reaction grid thereby functions as a heat exchanger between the carbide-water reactor and the steam expander loop. The calcium hydroxide produced by the carbide-water reaction flows through the grid for collection in a container 64. In one embodiment the reaction grid is formed by metal fins that are mechanically and thermally coupled to tubes that carry the feed water in a structure that resembles a typical automotive radiator. In an alternate embodiment (not shown), the carbide reactor may be of a counterflow type, with the carbide and water being provided thereto by the flow control 44 in opposite directions. The acetylene output is preferably adjacent the carbide input end to dry the acetylene as much as possible, with the calcium hydroxide output preferably being adjacent the water input end to maximize the carbide reaction prior to the expulsion of the calcium hydroxide. In the embodiment shown in the FIGURE, a pressure signal 42 controls the rate of the reaction in the carbide-water reactor through a flow control 44 that controls the rate at which the reactants, calcium carbide 56 and fuel water 58, are provided to the reactor.

In the embodiment shown in the FIGURE, a blower 70 draws air through an air intake 94 and air line 92 through a venturi 72. In other embodiments (not shown), the burner is naturally aspirated and no blower is used. The venturi mixes the air with acetylene drawn in from the dry acetylene supply line 90. The combustible fuel-air mixture is supplied to the burners 36 for combustion to produce heat that coverts the feed water in the boiler 32 to steam. The flow of air-fuel mixture may be throttled to control the power output of the system. The hot combustion gases are discharged through the boiler exhaust line 78.

The steam expander 20 may provide an output of mechanical energy in the form of rotary motion. The FIGURE shows the steam expander driving a generator 46 controllably driving one or more motors 48. A substantial flywheel 50 may be provided, if desired, to provide an energy storage capability for starting from a standing stop, and/or for storing energy during deceleration by reversing the roles of the generator and motor for braking. It will be appreciated that the mechanical output of the steam expander may be utilized by any of a variety of means known to those skilled in the art. The mechanical energy may be used as a source of stationary power or mobile power such as motive power for vehicles including automobiles, trucks, boats, ships, trains, airplanes, and the like.

The systems of the present invention, such as that shown in the FIGURE, incorporate several additional features to recover waste energy that is normally lost in prior art systems.

The outlet of the steam expander 22 includes gaseous hydrogen that results from dissociation of the feed water. A hydrogen trap 74 separates the gaseous hydrogen from the feedwater. The gaseous hydrogen is supplied to the venturi 72 through a hydrogen supply line 88 to become part of the fuel for combustion. This recovers a portion of the energy consumed by the dissociation of the feed water. The hydrogen trap may take the form of a cyclonic separator that causes the light hydrogen gas to rise to the top of the separator where it is drawn off by vacuum created by the venturi. While the FIGURE shows the hydrogen supply line joined to the dry acetylene supply line 90 at a tee at the venturi inlet, it will be appreciated that the venturi may have separate inlets allowing the acetylene and the hydrogen to be supplied directly to the venturi without joining the lines in a tee. The venturi may provide either a common set of venturi passages for both fuels as a mixture or may provide independent venturi passages for the acetylene and for the hydrogen. Providing separate venturi passages allows the aspiration of hydrogen from the hydrogen trap to be calibrated separately from the aspiration of acetylene. An air-fuel ratio sensor 69 may control one or more valves 68 in the fuel supply lines 88, 90 providing feedback control of the fuel supply.

After the hydrogen is removed, the feed water passes through an air preheater 60 that heats the combustion air drawn from the air intake 94 while cooling the feed water in heat exchange coils 62. The acetylene in the wet acetylene supply line 40, still having some moisture therein, is also passed through the air preheater 60 in acetylene coils 98. Thus the combustion air is further heated while the acetylene is cooled so that the water will condense out. The condensate water is collected in a water trap 96 and returned to the flow control 44 through condensate return line 66 to be used as fuel water. Thus while the acetylene is cooled in the air preheater 60, the heat removed therefrom is returned to the system as a result of the increased temperature in the combustion air and in the condensate return line 66. Further, the maximum amount of moisture has been removed from the acetylene prior to its combustion in the burners 36, thereby reducing the heat load which otherwise would be placed thereon.

The feed water in pump discharge line 30 is passed through a heat exchanger or heat scavenger 80 that uses the hot combustion gases in the boiler exhaust line 78 to preheat the feed water in heat exchange coils 76 before the feed water is returned to the boiler 32 through the carbide-water reactor 38 via a feed water line 84. The cooled combustion gases are exhausted through a vent 82. Thus a portion of the heat energy that would normally be lost in the exhaust of the heated combustion gases is captured in the preheating of the feedwater for conversion to useful work by the steam expander 20.

As seen in the FIGURE, heat exchange coils 54 are provided in the carbide-water reactor 38 to further preheat the feed water prior to the return of this water (or steam) through a preheated feed water line 52 to the boiler 32. This serves the dual function of cooling the reactor without requiring a great excess of water for this purpose, and recovers the heat of reaction in conversion of the carbide and water to acetylene and calcium hydroxide so as to improve efficiency in the overall energy conversion from the carbide to the drive system output power. Thus the carbide reactor 38 contains heat exchange coils 54 maintaining the reactor temperature within bounds and preheating the feed water returning to the boiler. Of course, while the quantity of water flowing through the heat exchange coils 54 in the reactor 38 is limited, the temperature in the reactor is self-regulating, as a higher output power demand for the steam expander 20 and boiler 32 will cause an increase both with respect to the rate of reaction in the reactor 38 and the water flow rate in the heat exchange coils 54. Also, even at a constant power setting, increases in the reactor temperature will result in heat recovery in the heat exchange coils 54 and greater preheating of the boiler make-up water (or steam), thereby reducing the demand for acetylene and the reaction rate required to provide that acetylene.

In the previous description it is to be noted that the boiler feed water has been identified as being either water or steam. Normally in a boiler system or steam expander system, the boiler feed water is relatively low temperature water, and in fact, in open systems, would normally be tap water at ordinary temperatures. However in the systems of the present invention, such as that shown in the FIGURE, the amount of heat recovered in the carbide-water reactor by the heat exchange coils 54 is substantial, which may convert the high pressure water in pump discharge line 30 to steam in preheated feed water line 52. (Though normally lower in temperature than the steam in the steam line 34 provided by the boiler 32.) The presence of water or steam in preheated feed water line 52 will depend upon the various parameters of the steam expander system, specifically, operating pressures and temperatures, the choice of which may readily be made by anyone of reasonable skill in the art depending upon the particular application and various arbitrary design choices made. Of course, in addition to the heat and acetylene outputs of the reactor, calcium hydroxide [Ca(OH)2] is also expelled from the reactor at a rate depending upon the rate of reaction, and in the system shown is collected in a container 64 for subsequent disposal, reprocessing into carbide, or for other uses, as calcium-hydroxide has other uses in both agriculture and the building industries.

It is fairly well known that acetylene is a difficult gas to store, as it exhibits a wide explosive range when mixed with air, and is subject to violent decomposition even in the pure state. Accordingly common recommendations are that it not be stored at elevated temperatures or pressurized beyond a gauge pressure of approximately 5 psi. Similarly, the wet process commonly used for generation of acetylene for carbide utilizes a great excess of water, with the heat of the carbide-water reaction being dissipated by the great quantities of excess water available. Wet process reactions typically are limited to well below the boiling temperature of water, and in fact are usually controlled to temperatures of 65° to 70° C. by feeding excess water to the generator and allowing it to overflow as an aqueous lime slurry. Obviously the use of such excesses of water in a reactor in the present invention would preclude the recovery of substantial amounts of heat from this reaction. Further, the excess water is, by the nature of the reaction, saturated with acetylene, giving rise to substantial losses of acetylene in the waste water.

In contrast to the foregoing, the present invention utilizes a carbide-water reactor which allows elevated temperatures so as to enable the recovery of the heat given off in the reaction by the heat exchange coils 54. In particular, the stability of acetylene is dependent upon certain extrinsic factors which, if properly controlled, substantially diminish the probability of decomposition and explosion. Further, in the present invention system such as in the system shown in the FIGURE, the acetylene is generated at a rate dependent upon the demand of the boiler 32, and is burned substantially immediately after its generation. The pressure in the steam line 34 may provide a steam pressure signal 24 provided to the reactant flow control 44 to decrease or increase the rate of acetylene generation as required to prevent over-pressure and under-pressure conditions in the output of the boiler. Because acetylene is generated in response to demand, the amount of acetylene present at any one time is extremely limited. The structure of the carbide-water reactor and other portions of the acetylene system may readily be of sufficient physical integrity to confine any such decomposition without incident. In that regard the products of such decomposition are carbon and hydrogen, both being highly combustible provided care is taken to avoid the build-up of carbon deposits in the burner systems. Also, other more complicated reactions may take place, such as polymerization and hydrogenation, though in general, the tendency for any of these reactions or decomposition may be substantially reduced by appropriate choice of materials in the carbide-reactor and acetylene lines.

The carbide-water reactor may be of substantially any suitable design for the desired purpose. By way of example, a generator for the acetylene manufacture from calcium carbide by the dry process is shown in U.S. Pat. No. 2,951,748. While the apparatus therein disclosed is generally intended for larger installations, it may readily be adapted for use as a small mobile acetylene generator, and further may be modified to include the heat exchanger schematically represented by the heat exchanging reaction grid 54 to preheat the boiler inlet water and simultaneously cool the acetylene generator. Care should be taken with such a generator however, as local temperatures may rise to as high as 1,000° C. if not adequately controlled, which temperatures may lead to some of the problems hereinbefore described. Preferably the generator is operated with the injection of just enough water or steam to substantially completely react with the carbide to provide essentially all of the acetylene potentially available from the carbide. Depending upon the characteristics of the reactor, there may also be substantial moisture in the form of steam in the acetylene generated, which moisture has the desirable effect of enhancing the stability of the acetylene at the elevated temperatures of the reactor. The steam in the carbide reactor and the acetylene generated also has the disadvantage, however, of creating a useless heat load on the system. By way of example, to the extent more water is provided to the carbide reactor than necessary for the carbide water reaction, this water will be converted to steam by the elevated temperatures of the reactor, thereby tapping some of the heat otherwise available in the reactor for the transfer to the fluid in the heat exchanging reaction grid 54. Further, the steam in the acetylene line also provides a heat load on the boiler combustion system, as this steam will be heated by the burning acetylene, thereby requiring some of the heat which otherwise would have been available for use in the boiler. Thus it is desirable that the carbide reactor be most efficient in assuring substantially complete reaction of the carbide with the minimum practical water or steam available. For this purpose it may be desirable to provide a carbide-water reactor having a counter flow characteristic, whereby the carbide and resulting calcium hydroxide flow through the carbide water reactor in one direction, with the water (which quickly becomes steam at the reactor temperatures) and acetylene flowing in the opposite direction. Such an arrangement provides maximum exposure of the nearly expended carbide to water adjacent the water input end (calcium hydroxide output end) of the reactor to assure the most complete reaction possible, and further provides the exposure of substantially unreacted carbide to the moist acetylene adjacent the acetylene output end of the reactor (the carbide input end) to "dry" the acetylene coming out of the reactor as much as possible by the reaction of the moisture in the acetylene with the fresh carbide entering that region.

An embodiment of the present invention has been disclosed and described in detail herein, exemplary of the many embodiments and various forms of implementation of the invention. While the embodiment discloses the use of a steam expander, other devices for converting heat to mechanical or electrical energy may also be used, provided they may also effectively utilize the heat of the carbide water reaction. Thus by way of example the present invention may also be utilized with closed or open looped steam turbine systems or other external combustion engines. Also while the embodiments disclosed utilize a dry process reactor where carbide and water are both directed to the reactor at controlled rates, alternate embodiments may control the flow of water (or steam) to carbide already in the reactor, or the flow of carbide to water (or steam) already in the reactor, utilizing either wet or dry processes. In fact, part of the turbine exhaust could be used for the reactor moisture requirement, thereby cutting down on the requirements for heat exchange in the reaction grid 54 in a closed loop system, or reducing the total available water requirements in an open loop system. Further, if a wet process is used, the reactor may be pressurized as desired to sustain elevated temperatures. While the several heat exchangers have been described in terms of particular mechanical configurations such as heat exchange coils, any suitable form of heat exchanger may be employed within the scope of the invention. Thus while the present invention has been disclosed and described herein with reference to a specific embodiment, it will be understood by those skilled in the art that various changes in form and detail may be made therein without departing from the scope and spirit of the present invention.

What is claimed is:

1. A power system comprising;
   a reactor utilizing a dry process for reacting calcium carbide and water to provide acetylene;
   a converter for converting a heat rate to power;
   a burner coupled to said reactor and said converter for burning the acetylene to provide a first source of heat to said converter and a source of heated exhaust gas;
   a heat scavenger coupled to said burner and said converter for conveying heat from said heated exhaust gas to said converter.

2. The power system of claim 1 wherein said converter converts a heat rate to electrical power.

3. The power system of claim 1 wherein said converter converts a heat rate to mechanical power.

4. The power system of claim 1 wherein said converter comprises a steam expander system.

5. The power system of claim 4 wherein said steam turbine system comprises a closed loop steam expander system.

6. The power system of claim 1 wherein said heat scavenger comprises a heat exchanger that preheats a water supply for said converter.

7. The power system of claim 1 further comprising an air preheater coupled to said burner and said converter for heating a supply of combustion air furnished to said burner with a heated exhaust from said converter.

8. The power system of claim 1 further comprising an air preheater coupled to said burner and said reactor for heating a supply of combustion air furnished to said burner and cooling the acetylene produced by the reactor.

9. The power system of claim 1 further comprising hydrogen separator coupled to said converter and said burner for extracting gaseous hydrogen from an exhaust stream from said converter and supplying said gaseous hydrogen to said burner for burning.

10. The power system of claim 9 wherein said hydrogen separator is a cyclonic separator.

11. The power system of claim 10 further comprising a venturi coupled to said burner for aspirating the acetylene and the gaseous hydrogen into an air stream for burning by said burner.

12. A power system comprising:
    a boiler;
    a feed water system coupled to said boiler for providing water to said boiler;
    a calcium carbide-water reactor for reacting calcium carbide and water utilizing a dry process to produce acetylene;
    an acetylene burner system coupled to said boiler and said calcium carbide-water reactor for heating said boiler by burning said acetylene to produce steam; and
    a steam expander coupled to said boiler for extracting power from the steam;
    a first heat exchanger coupled to said acetylene burner system and said feed water system for heating water provided to said boiler using heat in exhaust gas from said acetylene burner system.

13. The power system of claim 12 wherein said feed water system comprises a second heat exchanger coupled to said acetylene burner system and to said feed water system at the output of said steam expander for heating air provided to said acetylene burner system using heat in the output of said steam expander, and a pump coupled to said second heat exchanger for pumping water from said second heat exchanger into said first heat exchanger.

14. The power system of claim 12 further comprised of a condenser coupled between said reactor and said acetylene burner system for removing moisture from the acetylene produced by the reactor and preheating an air supply provided to said acetylene burner system.

15. The power system of claim 12 further comprised of a hydrogen separator coupled to said steam turbine and said acetylene burner system for extracting gaseous hydrogen from an exhaust stream from said steam turbine and supplying said gaseous hydrogen to said acetylene burner system for burning.

16. The power system of claim 15 wherein said hydrogen separator is a cyclonic separator.

17. The power system of claim 16 further comprising a venturi coupled to said burner for aspirating the acetylene and the gaseous hydrogen into an air stream for burning by said burner.

18. A power system comprising:
    a boiler;
    a feed water system coupled to said boiler for providing water to said boiler;

a calcium carbide-water reactor for reacting calcium carbide and water utilizing a dry process to produce acetylene;

an acetylene burner system coupled to said boiler and said calcium carbide-water reactor for heating said boiler by burning said acetylene to produce steam;

a steam expander coupled to said boiler for extracting power from the steam;

a first heat exchanger coupled to said acetylene burner system and said feed water system for heating water provided to said boiler using heat in exhaust gas from said acetylene burner system; and a second heat exchanger coupled to said acetylene burner system and to said feed water system at the output of said steam expander for heating air provided to said acetylene burner system using heat in the output of said steam expander, and a pump coupled to said second heat exchanger for pumping water from said second heat exchanger into said first heat exchanger.

19. The power system of claim 18 further comprised of a condenser coupled between said reactor and said acetylene burner system for removing moisture from the acetylene produced by the reactor and preheating an air supply provided to said acetylene burner system.

20. The power system of claim 18 further comprised of a hydrogen separator coupled to said steam turbine and said acetylene burner system for extracting gaseous hydrogen from an exhaust stream from said steam turbine and supplying said gaseous hydrogen to said acetylene burner system for burning.

* * * * *